US012686253B2

(12) United States Patent
Wagner

(10) Patent No.: US 12,686,253 B2
(45) Date of Patent: Jul. 21, 2026

(54) DOOR MODULE FOR A VEHICLE DOOR AND VEHICLE DOOR FOR A MOTOR VEHICLE

(71) Applicant: Brose Fahrzeugteile SE & Co. Kommanditgesellschaft, Bamberg, Bamberg (DE)

(72) Inventor: Mark Wagner, Breitengüssbach (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 18/667,067

(22) Filed: May 17, 2024

(65) Prior Publication Data

US 2024/0300305 A1      Sep. 12, 2024

Related U.S. Application Data

(63) Continuation of application No. PCT/EP2022/082333, filed on Nov. 17, 2022.

(30) Foreign Application Priority Data

Nov. 17, 2021    (DE) ..................... 10 2021 212 922.6

(51) Int. Cl.
B60J 5/04          (2006.01)
B60J 10/75        (2016.01)

(52) U.S. Cl.
CPC ............. B60J 5/0416 (2013.01); B60J 10/75 (2016.02)

(58) Field of Classification Search
CPC ......... B60J 5/0416; B60J 10/75; B60J 5/0412
See application file for complete search history.

(56) References Cited

U.S. PATENT DOCUMENTS

| | | | | |
|---|---|---|---|---|
| 4,648,208 A | * | 3/1987 | Baldamus .............. | B60J 5/0416 |
| | | | | 49/502 |
| 6,615,546 B2 | * | 9/2003 | Furuyama ............... | B60R 13/02 |
| | | | | 296/146.7 |
| 6,732,474 B1 | * | 5/2004 | Eck ........................ | B60J 5/0416 |
| | | | | 49/502 |
| 6,820,919 B2 | * | 11/2004 | Florentin ............... | B60J 5/0463 |
| | | | | 49/377 |
| 7,111,894 B2 | * | 9/2006 | Kora ...................... | B60J 5/0468 |
| | | | | 296/146.1 |
| 7,581,779 B2 | * | 9/2009 | Baumgart .............. | B60J 5/0416 |
| | | | | 49/502 |
| 9,669,806 B2 | * | 6/2017 | Phillip .................... | B60J 10/34 |
| 11,498,398 B2 | * | 11/2022 | Moriyama ............. | B60J 5/0429 |

FOREIGN PATENT DOCUMENTS

| | | | |
|---|---|---|---|
| DE | 3209052 | A1 | 9/1983 |
| DE | 29807479 | U1 | 7/1998 |
| DE | 102011011828 | A1 | 8/2012 |
| EP | 1197366 | A2 | 4/2002 |
| EP | 1486366 | A2 | 12/2004 |
| WO | 0234556 | A1 | 5/2002 |

* cited by examiner

*Primary Examiner* — Muhammad Ijaz
*Assistant Examiner* — Susan M. Heschel
(74) *Attorney, Agent, or Firm* — Laurence A. Greenberg; Werner H. Stemer; Ralph E. Locher

(57) ABSTRACT

A door module for a vehicle door includes an assembly carrier which extends up to a door parapet line in an assembled state. A flange which substantially projects vertically from the assembly carrier has a pre-mounted shaft seal for sealing a door parapet shaft against a windowpane. A vehicle door for a motor vehicle is also provided.

4 Claims, 1 Drawing Sheet

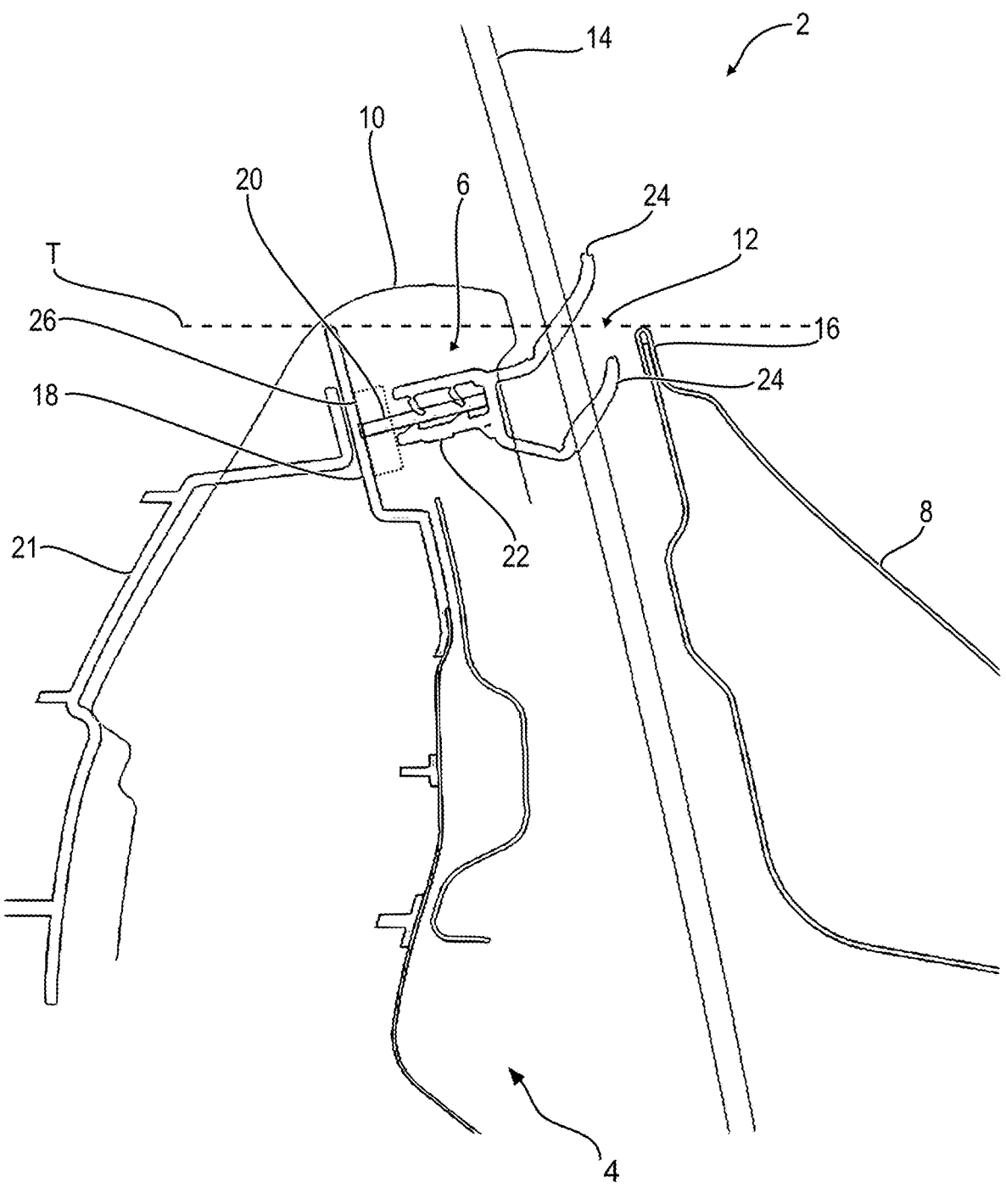

DOOR MODULE FOR A VEHICLE DOOR AND VEHICLE DOOR FOR A MOTOR VEHICLE

CROSS-REFERENCE TO RELATED APPLICATION

This application is a continuation, under 35 U.S.C. § 120, of copending International Patent Application PCT/EP2022/082333, filed Nov. 17, 2022, which designated the United States; this application also claims the priority, under 35 U.S.C. § 119, of German Patent Application DE 10 2021 212 922.6, filed Nov. 17, 2021; the prior applications are herewith incorporated by reference in their entirety.

FIELD AND BACKGROUND OF THE INVENTION

The invention relates to a door module for a vehicle door, having a device carrier which in the assembled state extends up to a door parapet line. The invention furthermore relates to a vehicle door having such a door module.

A door body of a vehicle door typically has a door carcass or body with a door frame and with a door outer panel that forms the outer door skin of the vehicle door, and a door interior trim which is on the inside of the vehicle and connected to the door outer panel. The door frame therein can have a window frame for a window glass or be of a frameless embodiment. Formed between the door interior trim and the door outer panel is a cavity as an assembly space in which functional components of the vehicle door such as, for example, a window regulator, a door lock, an airbag, a loudspeaker or the like are disposed.

For assembling the vehicle door, it is possible to pre-assemble such functional components on a carrier plate, also referred to as a door module carrier or device carrier. The carrier plate populated with the functional components is also referred to as a door module and is placed as a pre-assembled functional group onto a corresponding assembly aperture of the door frame in order to cover the latter, in particular so as to implement a separation between a wet space and a dry space of the vehicle door. The electronics of the functional components are in particular received in the dry space therein, wherein the mechanical components are in particular integrated in the wet space. In this way, there are fewer components overall, the potential for errors is reduced, and sealing individual electronic functional elements is rendered superfluous. Furthermore, the carrier plate of the door module is a protection in relation to moisture and also shields the interior of the vehicle in relation to the ingress of dust and external noise.

Movable (vehicle) window glass is nowadays usually moved between a closed position and an open position by actuating devices which as (vehicle) window regulators are operated electrically or by an electric motor. For that purpose, the vehicle door has a door parapet with a door parapet shaft (door parapet slot) in which the window glass is adjustably fitted.

An inner shaft seal, thus a shaft seal offset from the window glass toward the interior of the vehicle, which is conventionally assembled on a flange on the door carcass on the side of the wet space by an OEM (original equipment manufacturer) is provided for sealing the door parapet in relation to the window glass. Assembling the shaft seal therein requires an additional assembling step when producing and assembling the vehicle door.

SUMMARY OF THE INVENTION

It is accordingly an object of the invention to provide a door module for a vehicle door and a vehicle door for a motor vehicle, which overcome the hereinafore-mentioned disadvantages of the heretofore-known devices of this general type and which reduce the time for assembling the vehicle door.

With the foregoing and other objects in view there is provided, in accordance with the invention, a door module for a vehicle door, having a device carrier which in the assembled state extends up to a door parapet line, and a flange which projects substantially perpendicularly from the device carrier and has a pre-assembled shaft seal for sealing a door parapet shaft in relation to a window glass.

With the objects of the invention in view, there is concomitantly provided a vehicle door for a motor vehicle, having a door parapet with a door parapet shaft and a window glass retractable into the latter, as well as a door module according to the invention, wherein the shaft seal of the door module seals the door parapet shaft in relation to the window glass.

Advantageous structural embodiments and refinements are the subject matter of the dependent claims. The advantages and structural embodiments set forth in terms of the door module can also be applied in an analogous manner to the vehicle door, and vice versa.

The door module according to the invention is provided for a vehicle door, in particular for a side door, of a motor vehicle, and is also suitable and specified for the vehicle door. The door module herein has an injection-molded device carrier or functional carrier (door module carrier) for receiving or mounting functional components of the vehicle door and/or as a separation between the wet space and the dry space. The device carrier in the assembled state herein extends up to a door parapet line of the vehicle door. The electrical and electronic as well as mechanical functional components of the door are substantially positioned and (pre-) assembled on the device carrier. For example, a window regulator motor, a cable drive, a door control unit, a cable assembly, a side door drive, a door lock, a soundbox or the like are disposed as functional components on the device carrier.

According to the invention, an (assembly) flange which projects substantially perpendicularly and has a pre-assembled shaft seal is disposed on a wet space side of the device carrier, thus on a planar side of the device carrier that in the assembled state is disposed in the wet space. The flange, or the shaft seal, herein is expediently disposed in the door parapet region of the device carrier. The shaft seal herein is in particular an inner shaft seal for sealing a door parapet shaft in relation to window glass or windowpane which is retractable into the latter. A particularly suitable door module is implemented as a result.

According to the invention, the door module is in this way enhanced with a shaft seal as a pre-assembled functional element for the vehicle door. In other words, a shaft seal integrated into the module is provided. As a result, it is possible to supply a pre-tested unit, or shaft seal, to an original equipment manufacturer, as a result of which times for assembling on the line of the original equipment manufacturer are advantageously reduced.

In one advantageous embodiment, the flange is integrally, thus in one piece or monolithically, molded on the device carrier. In other words, the flange for the shaft seal is structurally attached to the device carrier.

In an alternative and likewise advantageous embodiment, at least one functional component is assembled on the device carrier, wherein the flange is integrally molded on the functional component. This means that the flange for the shaft seal is provided structurally on a functional component pre-assembled on the device carrier. The functional component herein can be, for example, a soundbox assembled on the wet space side.

In a conceivable refinement, the shaft seal is attached to the flange in a form-locking and/or force-locking manner. For this purpose, the shaft seal has, for example, a plug-in receptacle which is of a corresponding configuration and is attached to the flange.

The conjunction "and/or" herein and hereunder is understood to mean that the features linked by this conjunction can be configured both conjointly and as mutual alternatives.

A "form-lock" or a "form-locking connection" between at least two interconnected parts herein and hereunder is understood to mean in particular that the cohesion between the interconnected parts in at least one direction is effected by a direct mutual engagement of contours of the parts per se, or by an indirect mutual engagement by way of an additional connecting part. The "blocking" of any relative movement in this direction is thus performed due to the shape.

A "force-lock" or a "force-locking connection" between at least two interconnected parts herein and hereunder is understood to mean in particular that the interconnected parts are prevented from sliding off one another by virtue of a frictional force acting therebetween. In the absence of a "connecting force" that causes this frictional force (meaning that force that presses the parts against one another, for example a screw force or the weight per se), the force-locking connection cannot be maintained and thus may be released.

In an alternative configuration, the shaft seal is injection-molded directly on the flange by a bi-component injection-molding method. This guarantees assembling which is particularly reduced in terms of complexity.

The shaft seal can also be fastened to the device carrier, or a component assembled on the device carrier, by way of other suitable methods.

In a preferred structural embodiment, the shaft seal extends substantially parallel to the flange. In other words, the shaft seal extends approximately perpendicularly to the device carrier.

Indications in terms of spatial directions hereunder are also stated in particular in a coordinate system of the motor vehicle (vehicle coordinate system) relating to an exemplary installed situation in a side door of the motor vehicle. The abscissa axis (X-axis, X-direction) herein is oriented along the vehicle longitudinal direction (direction of travel), and the ordinate axis (Y-axis, Y-direction) is oriented along the vehicle transverse direction, and the applicate axis (Z-axis, Z-direction) is oriented along the vehicle height.

According to the prior art, the assembly flange is oriented so as to be approximately parallel to the Z-axis in such a way that the shaft seal is of an approximately L-shaped embodiment. The vertical L-leg herein is attached to the assembly flange, whereby sealing tabs, which project in the Y-direction and in the assembled state by way of the free ends bear resiliently on the window glass, are integrally molded on the horizontal L-legs. As a result of the flange orientation according to the invention, perpendicular to the XZ-plane of the device carrier, thus substantially parallel to the Y-direction, the shape of the shaft seal can be simplified because no perpendicular deflection from the Z-direction to the Y-direction is required for orienting the sealing tabs. In this way, the shaft seal can be of an approximately I-shaped embodiment, whereby the sealing tabs are integrally molded on the end side.

The vehicle door according to the invention is embodied as a side door for a motor vehicle, for example, The vehicle door herein has a door parapet with a door parapet shaft, and a window glass which is retractable into the latter. The vehicle door furthermore has a door module as described above, wherein the shaft seal of the door module seals the door parapet shaft in relation to the window glass. A particularly suitable vehicle door is implemented as a result.

Other features which are considered as characteristic for the invention are set forth in the appended claims.

Although the invention is illustrated and described herein as embodied in a door module for a vehicle door and a vehicle door for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

The FIGURE of the drawing is a fragmentary, diagrammatic, sectional view of a vehicle door having a door module and a shaft seal.

DETAILED DESCRIPTION OF THE INVENTION

Referring now in detail to the single FIGURE of the drawing, there is seen a vehicle door 2 having a door module 4 with a shaft seal 6 integrated into the door module.

The vehicle door 2 has a door shell or carcass with a door frame, not shown in more detail, on which a door outer panel 8 on the outside, and a door interior trim 10 on the inside are disposed. The door frame has an assembly aperture on which the door module 4 is assembled as a separation between the wet space and the dry space.

Parts of a door parapet region of the vehicle door 2 are shown in the diagrammatic sectional illustration in the FIGURE. The vehicle door 2 shown therein has a door parapet shaft 12 by way of which a window glass 14 is adjustable into the wet space of the vehicle door 2. The window glass 14 shown therein is adjustable by using a window regulator of the door module 4, which is not illustrated in more detail.

The vehicle door 2 has an outer shaft seal which is not shown in more detail and is able to be assembled on a flange 16 of the door outer panel 8 and externally seals the door parapet shaft 12 in relation to the window glass 14. The shaft seal 6 is an inner shaft seal and internally seals the door parapet shaft in relation to the window glass 14.

The door module 2 has an injection-molded device carrier 18 on which an (assembly) flange 20 is integrally molded on the side of the door parapet in the illustrated exemplary embodiment. The (assembly) flange 20 projects approximately perpendicularly from the device carrier 18 on the side of the wet space. For example, a soundbox 21 which is a loudspeaker housing of a door loudspeaker, is pre-assembled on the device carrier 18. Portions of the soundbox 21 extend through the door interior trim 10, for example.

A parapet line T indicates the upper boundary of the body opening into which the vehicle door is inserted. This line T can be described as an imaginary line that runs along the upper edge of the door opening. The parapet line T represents the transition point between the door and the rest of the vehicle body. The assembly carrier 18 extends up to the parapet line as shown in the FIGURE.

The shaft seal 6 has a plug-in receptacle 22 through the use of which the shaft seal 6 is attached to the projecting flange 20 in a form-locking and/or force-locking manner. The plug-in receptacle 22 has, for example, holding cams and clamping tabs, not referenced in more detail, in order to mount or fasten the shaft seal 6 on or to the flange 20, in particular in a clamping manner. Two angular sealing tabs 24, which bear resiliently on the window glass 14 by way of their free ends in the assembled state, are integrally molded on the plug-in receptacle 22. In the FIGURE, the sealing tabs 24 are illustrated so as to overlap the window glass 14. The shaft seal 6 therein is produced as an injection-molded part from a (rubbery) elastic material, for example. The shaft seal 6 shown therein has a substantially I-shaped structural embodiment, whereby the plug-in receptacle 22 is open on a first end side, and whereby the sealing tabs 24 are integrally molded on an opposite second end side. In this way, the shaft seal 6 extends substantially parallel to the flange 20.

The claimed invention is not limited to the previously described exemplary embodiments. Instead, other variants of the invention can also be derived therefrom by the person skilled in the art within the scope of the disclosed claims, without departing from the subject matter of the claimed invention. Furthermore, in particular all individual features described in the context of the different exemplary embodiments can be combined with one another in a different way within the scope of the disclosed claims, without departing from the subject matter of the claimed invention.

It is thus conceivable, for example, that the shaft seal 6 is injection-molded directly on the flange 20 by using a bi-component injection-molding method. It is likewise conceivable, for example, that the flange 20 is integrally molded on a functional component or element 26 which is pre-assembled on the device carrier 18. The functional component or element 26 can, in principle can be any functional element of the vehicle door mounted on the outer side of the assembly carrier 18.

The following is a summary list of reference numerals and the corresponding structure used in the above description of the invention:

12 Vehicle door
4 Door module
6 Shaft seal
8 Door outer panel
10 Door interior trim
12 Door parapet shaft
14 Window glass

16 Flange
18 Device carrier
20 Flange
21 Soundbox
22 Plug-in receptacle
24 Sealing tab
26 Functional component
T Parapet line

The invention claimed is:

1. A door module for a vehicle door, the vehicle door including a door frame with an outer panel that forms the outer door skin of the vehicle door and a door interior trim that is on the inside of the vehicle, the door module comprising:

a device carrier including an injection-molded carrier plate configured to carry electrical, electronic and/or mechanical functional components pre-assembled thereon, said device carrier extending up to a door parapet line in an assembled state, said device carrier being arranged between the outer panel and the door interior trim;

a flange projecting substantially perpendicularly from said device carrier, said flange having a pre-assembled shaft seal for sealing a door parapet shaft relative to a window glass;

said shaft seal extending substantially parallel to said flange, being substantially I-shaped and having two sealing tabs;

said shaft seal having a linear plug-in receptacle attaching said shaft seal to said flange in at least one of a form-locking or force-locking manner;

the door module being a pre-assembled unit configured to be mounted as a unit onto a mounting opening of the door frame; and the door module implementing a separation between a wet space and a dry space of the vehicle door when the door module is mounted onto the mounting opening of the door frame.

2. The door module according to claim 1, wherein said flange is integrally molded on said device carrier.

3. The door module according to claim 1, which further comprises at least one functional component assembled on said device carrier, said flange being integrally molded on said at least one functional component.

4. A vehicle door for a motor vehicle, the vehicle door comprising:

a door frame including an outer panel that forms the outer door skin of the vehicle door;

a door interior trim configured to be inside the vehicle;

a door parapet having a door parapet shaft and a window glass retractable into said door parapet shaft; and a door module according to claim 1, said door module disposed in said door between said outer door skin and said door interior trim;

said shaft seal of said door module sealing said door parapet shaft relative to said window glass.

* * * * *